United States Patent
Matsuda et al.

(10) Patent No.: US 11,230,284 B2
(45) Date of Patent: Jan. 25, 2022

(54) DRIVING ASSISTANCE APPARATUS AND DRIVING ASSISTANCE METHOD

(71) Applicant: HITACHI AUTOMOTIVE SYSTEMS, LTD., Hitachinaka (JP)

(72) Inventors: Satoshi Matsuda, Tokyo (JP); Yoshiyuki Yoshida, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 242 days.

(21) Appl. No.: 16/463,452

(22) PCT Filed: Mar. 2, 2018

(86) PCT No.: PCT/JP2018/007935
§ 371 (c)(1),
(2) Date: May 23, 2019

(87) PCT Pub. No.: WO2018/168512
PCT Pub. Date: Sep. 20, 2018

(65) Prior Publication Data
US 2019/0351900 A1    Nov. 21, 2019

(30) Foreign Application Priority Data

Mar. 17, 2017   (JP) .............................. JP2017-052688

(51) Int. Cl.
*B60W 30/095*   (2012.01)
*B60W 30/09*    (2012.01)
(Continued)

(52) U.S. Cl.
CPC ........ *B60W 30/0956* (2013.01); *B60W 30/09* (2013.01); *B60W 50/14* (2013.01);
(Continued)

(58) Field of Classification Search
CPC .. B60W 30/0956; B60W 30/09; B60W 50/14; B60W 2420/42; B60W 2420/54; B60W 2520/28; G08G 1/16
(Continued)

(56) References Cited

U.S. PATENT DOCUMENTS 9,283,960 B1*    3/2016  Lavoie .................. B60W 10/20
2017/0072947 A1*  3/2017  Lavoie ............... B62D 15/0285
(Continued)

FOREIGN PATENT DOCUMENTS

JP    2001-222800 A    8/2001
JP    2005-189936 A    7/2005
(Continued)

OTHER PUBLICATIONS

Extended European Search Report issued in European Patent Application No. 18768495.6 dated Nov. 20, 2020, (10 pages).
(Continued)

*Primary Examiner* — Thomas G Black
*Assistant Examiner* — Matthias S Weisfeld
(74) *Attorney, Agent, or Firm* — Foley & Lardner LLP

(57) ABSTRACT

The present driving assistance apparatus assists driving from a vehicle stop state in a predetermined area. The apparatus acquires outside world information from the surroundings of a vehicle, detects a place and position to which the vehicle can move, detects a position of the vehicle, calculates a movement route when the vehicle moves in a predetermined direction by automatic driving from a vehicle stop state in a predetermined area, and determines a safety confirmation position at which the driver can visually confirm a surrounding traveling environment on the movement route. The route is calculated based on the outside world information and the position of vehicle. The driving assistance apparatus reduces a speed of the vehicle to a predetermined speed or less so
(Continued)

that the driver can visually confirm the surrounding traveling environment at the safety confirmation position.

10 Claims, 13 Drawing Sheets

(51) Int. Cl.
  *B60W 50/14* (2020.01)
  *G08G 1/16* (2006.01)
(52) U.S. Cl.
  CPC ......... *G08G 1/16* (2013.01); *B60W 2050/146* (2013.01); *B60W 2420/42* (2013.01); *B60W 2420/54* (2013.01); *B60W 2520/28* (2013.01)
(58) Field of Classification Search
  USPC .......................................................... 701/23
  See application file for complete search history.

(56) References Cited

U.S. PATENT DOCUMENTS

| | | |
|---|---|---|
| 2018/0037262 A1 | 2/2018 | Imai |
| 2020/0148263 A1 | 5/2020 | Imai |

FOREIGN PATENT DOCUMENTS

| | | | |
|---|---|---|---|
| JP | 2007216763 | * | 8/2007 |
| JP | 2007219763 | * | 8/2007 |
| JP | 2009-271760 A | | 11/2009 |
| JP | 2012-056428 A | | 3/2012 |
| JP | 2014-108711 A | | 6/2014 |
| JP | 2014108711 | * | 6/2014 |
| JP | 2016-031660 A | | 3/2016 |
| JP | 2016-060336 A | | 4/2016 |
| JP | 2017-224075 A | | 12/2017 |
| WO | WO-2014/203334 A1 | | 12/2014 |
| WO | WO-2016/158236 A1 | | 10/2016 |

OTHER PUBLICATIONS

Office Action issued in corresponding Japanese Patent Application No. 2019-505873 dated Jul. 21, 2020, with English machine translation.

International Search Report with English translation and Written Opinion issued in corresponding application No. PCT/JP2018/007935 dated May 15, 2018.

* cited by examiner

DRIVING ASSISTANCE APPARATUS AND DRIVING ASSISTANCE METHOD

TECHNICAL FIELD

The present invention relates to a driving assistance apparatus and a driving assistance method.

BACKGROUND ART

There is known a driving assistance apparatus that assists a driver in driving a vehicle (PTL 1). PTL 1 describes a technique "to configure so that in a case where a vehicle traveling by automatic operation control enters a branch point, an external camera 19 installed on the vehicle detects a road environment of another road connected to the branch point, it is determined whether the vehicle can enter the branch point on the basis of the detected road environment, and in a case where it is determined that the vehicle can enter the branch point, the vehicle is moved to a position at which the driver of the vehicle can visually confirm the road environment of another road and then the vehicle is temporarily stopped".

CITATION LIST

Patent Literature

PTL 1: JP 2016-060336 A

SUMMARY OF INVENTION

Technical Problem

In PTL 1, before an own vehicle enters an intersection with poor visibility, the vehicle is moved to a position at the situation of the intersection can be visually confirmed and then the vehicle is stopped. Then, the driver visually confirms the intersection. However, in PTL 1, only fixed installation objects such as the intersection and buildings are considered to determine a position at the driver can visually confirm the situation of the intersection. Therefore, it is difficult to apply the prior art described in PTL 1 to a place where a surrounding environment of the own vehicle can dynamically change such as a parking lot.

The present invention has been made in view of the above problems, and an object of the present invention is to provide a driving assistance apparatus and a driving assistance method capable of assisting driving from a vehicle stop state in a predetermined area.

Solution to Problem

To solve the above problems, a driving assistance apparatus according to the present invention is a driving assistance apparatus that assists driving of a vehicle and includes an outside world information acquiring unit that acquires outside world information on the surroundings of an own vehicle, a vehicle position detecting unit that detects a position of the own vehicle, a movement route calculating unit that calculates a movement route in a case where the own vehicle moves in a predetermined direction by automatic driving from a vehicle stop state in a predetermined area, and a safety confirmation position determining unit that determines a safety confirmation position present on the movement route calculated by the movement route calculating unit on the basis of the outside world information acquired by the outside world information acquiring unit and the position of the own vehicle acquired by the vehicle position detecting unit, the safety confirmation position being a safety confirmation position at which a driver can visually confirm a surrounding traveling environment, and the driving assistance apparatus reduces a speed of the own vehicle to a predetermined speed or less so that the driver can visually confirm the surrounding traveling environment at the safety confirmation position.

Advantageous Effects of Invention

According to the present invention, when the own vehicle automatically drives in the predetermined direction from the vehicle stop state in the predetermined area, the driver can visually confirm the surrounding traveling environment and usability and safety can be improved.

DESCRIPTION OF EMBODIMENTS

Figure 1:
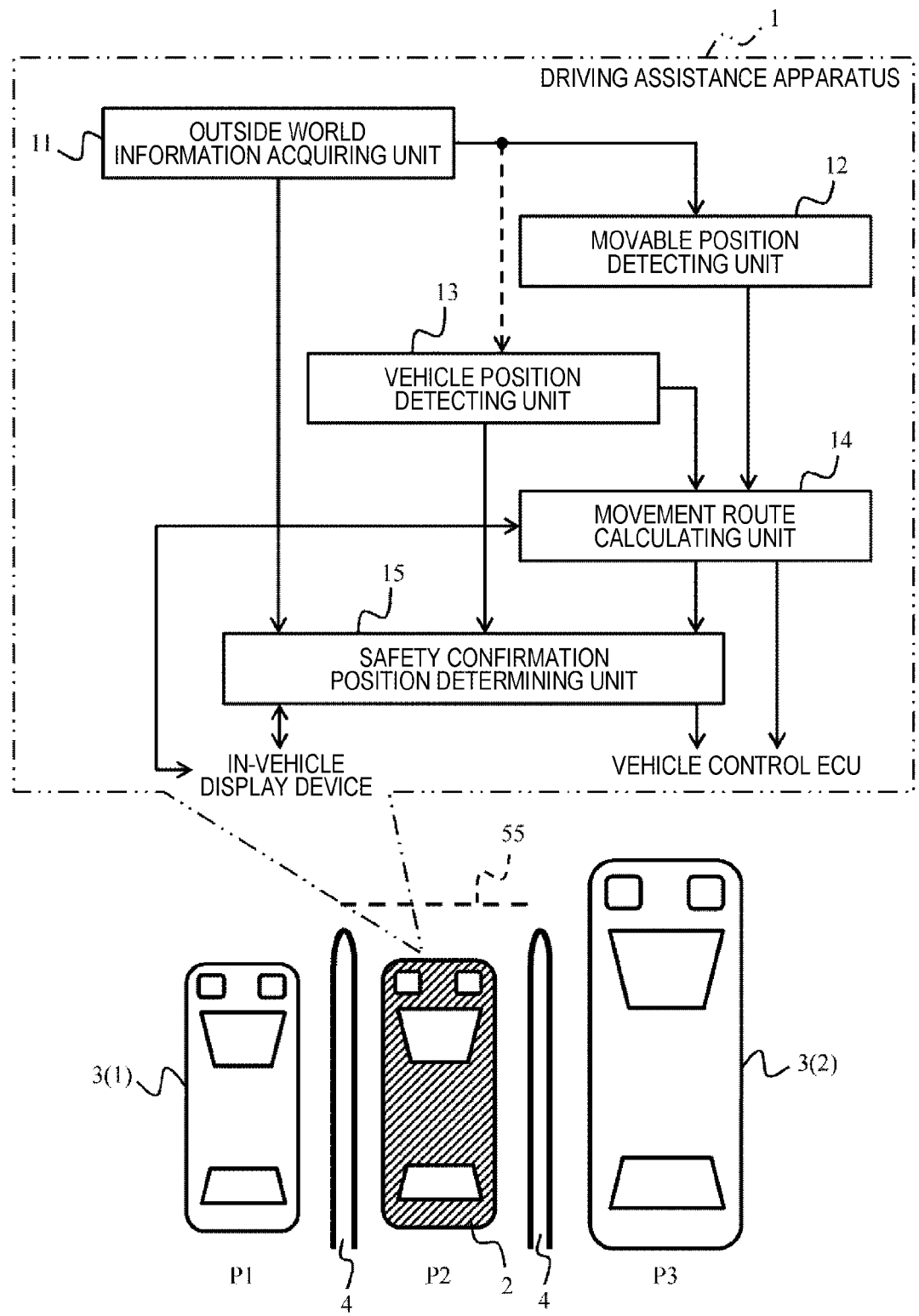
FIG. 1 is a descriptive view showing an overall outline of a driving assistance apparatus.

Embodiments according to the present invention will be described below with reference to the drawings. A driving assistance apparatus 1 according to the present embodiment can be applied to a mobile body such as a passenger car, a truck, a bus, a fire engine, a police vehicle, a tractor, and a construction machine. The driving assistance apparatus 1 according to the present embodiment can assist driving, for example, in a case where a vehicle is moved from a parking slot in a parking lot (that is, in a case where the vehicle is caused to exit the parking slot). The driving assistance apparatus 1 according to the present embodiment can be applied not only to a case of exiting the parking slot, but also, for example, to a case of moving in a predetermined direction from a state of the vehicle stopping at a temporary stop line. Hereinafter, a vehicle 2 on which the driving assistance apparatus 1 according to the present embodiment is mounted may be referred to as an own vehicle 2.

The driving assistance apparatus 1 includes, for example, an outside world information acquiring unit 11 that acquires outside world information from a sensor for detecting the outside world, a vehicle position detecting unit 13 that detects a position of the own vehicle 2, a movement route calculating unit 14 that calculates a planned route to travel when the own vehicle 2 automatically exits the parking slot from a parking position, and a safety confirmation position determining unit 15 that determines a safety confirmation position 55 at which a driver can visually confirm a traveling area on the bases of the position of the own vehicle 2 detected by the vehicle position detecting unit 13 and the outside world information acquired by the outside world information acquiring unit 11. Then, the driving assistance apparatus 1 performs control so that the vehicle 2 temporarily stops or decelerates at the safety confirmation position 55 or so that the driver is urged to confirm at the safety confirmation position 55.

By analyzing environmental information on the surroundings of the vehicle 2 acquired using a sensor (a camera 25 and the like described later) mounted on the vehicle 2, the driving assistance apparatus 1 according to the present embodiment can calculate the planned route to travel when the vehicle 2 exits the parking slot from the parking position Then, the driving assistance apparatus 1 starts parking-slot-exiting assistance on the basis of the environmental information and the planned route, automatically moves the vehicle 2 to a position at which the driver can confirm the safety of the surroundings and temporarily stops the parking-slot-exiting assistance once. The driving assistance apparatus 1 resumes a parking-slot-exiting assistance function after detecting that the driver has confirmed the safety of the surroundings.

First Embodiment

An embodiment will be described with reference to FIGS. 1 to 11. FIG. 1 is a descriptive view showing an overall outline of a driving assistance apparatus 1.

As shown in the lower side of FIG. 1, a plurality of parking slots P1 to P3 is provided in a parking lot, and vehicles 2, 3 (1), and 3 (2) are parked so as to be accommodated in those parking slots. The parking slots P1 to P3 are separated by parking frames 4 on which paint or the like is applied. The vehicle 2 (own vehicle 2) on which the driving assistance apparatus 1 is mounted is parked in the slot P2. Other vehicles 3 (1) and 3 (2) are respectively parked on the left and right sides of the own vehicle 2. In a case where other vehicles 3 (1) and 3 (2) are not distinguished from each other, other vehicles 3 (1) and 3 (2) are called another vehicle 3.

The driving assistance apparatus 1 is configured as an electronic control unit (ECU) and includes, for example, an outside world information acquiring unit 11, a movable position detecting unit 12, a vehicle position detecting unit 13, a movement route calculating unit 14, and a safety confirmation position determining unit 15.

Figure 4:
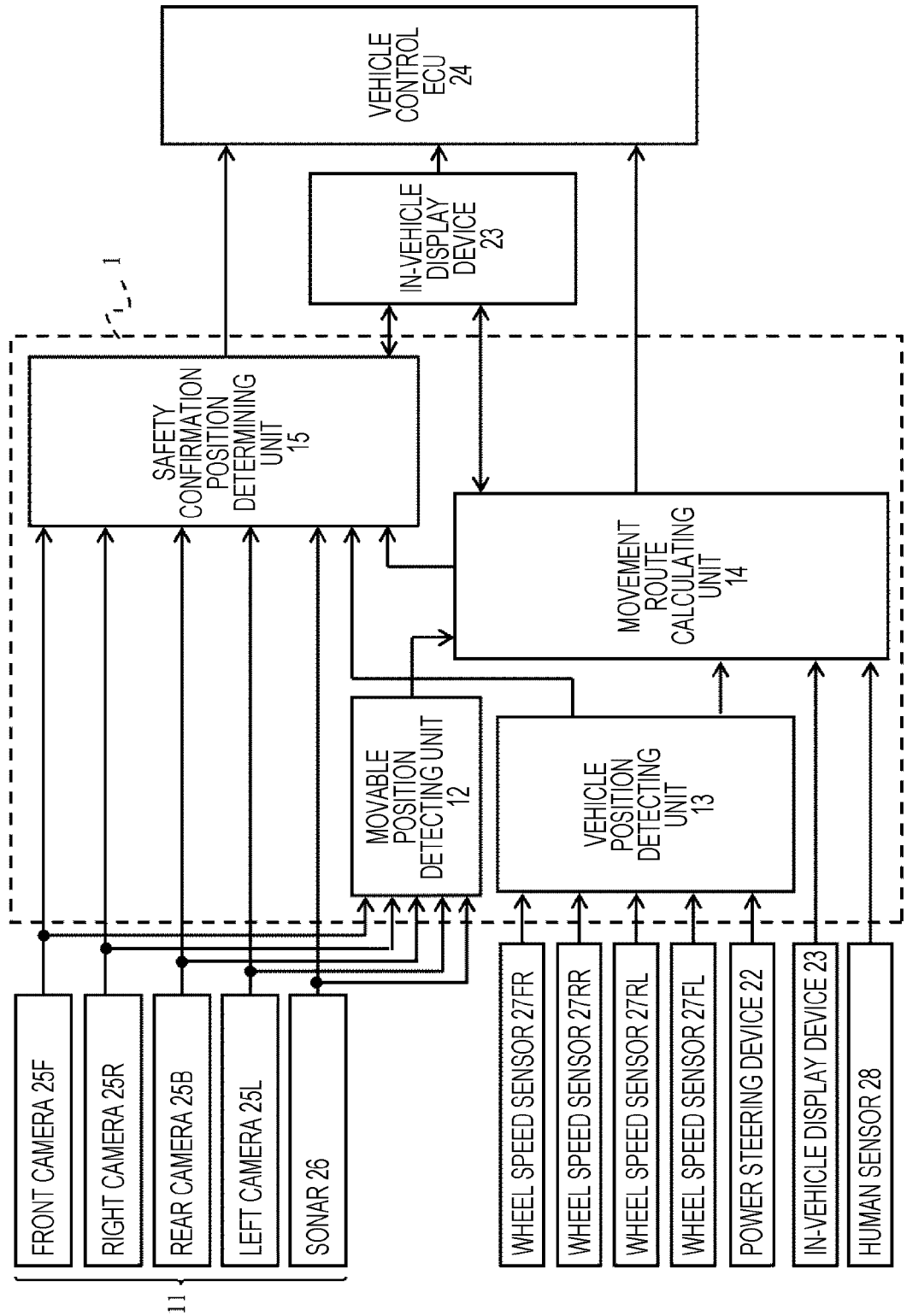
FIG. 4 is a block diagram showing a functional configuration of the driving assistance apparatus.

The outside world information acquiring unit 11 acquires outside world information through a camera 25 and the like as described later. The acquired outside world information is input to, for example, the movable position detecting unit 12 and the safety confirmation position determining unit 15. The outside world information may be input also to the vehicle position detecting unit 13. As shown in FIG. 4, the outside world information acquiring unit 11 includes, for example, the camera 25 and a sonar 26.

When the vehicle 2 exits the parking slot P2, the movable position detecting unit 12 detects a space possible for exiting the parking slot (a place and a position to which the vehicle 2 can be moved). In a case where the vehicle 2 can exit to both left and right sides, both the left direction and the right direction are detected as the spaces possible for exiting the parking slot. Meanwhile, in a case where there is a wall or a building in the right direction, only the left direction is detected as the space possible for exiting the parking slot. Hereinafter, the space possible for exiting the parking slot may be referred to as a place possible for exiting the parking slot or a position possible for exiting the parking slot.

The vehicle position detecting unit 13 detects a current position of the vehicle 2. The vehicle position detecting unit 13 calculates a vehicle position on the basis of a signal from a sensor group described later with reference to FIGS. 2 and 3. The position of the vehicle 2 may be calculated using a global positioning system (GPS) signal from the sky or the surface of the earth.

When assisting exiting the parking lot, the movement route calculating unit 14 generates longitude in the case of exiting the parking slot by automatic driving. The movement route calculating unit 14 calculates a movement route at the time of exiting the parking slot on the basis of a detection result of the movable position detecting unit 12 and a detection result of the vehicle position detecting unit 13.

The safety confirmation position determining unit 15 calculates at least one safety confirmation position 55 for the driver of the vehicle 2 to visually confirm an environment of the surroundings and to confirm safety at the time of exiting the parking slot. The safety confirmation position determining unit 15 determines at least one safety confirmation position 55 on the basis of the outside world information from the outside world information acquiring unit 11, vehicle position information from the vehicle position detecting unit 13, and movement route information from the movement route calculating unit 14.

A vehicle control ECU 24 (see FIG. 2) that controls the traveling of the vehicle 2 starts the movement of the vehicle 2 along the movement route calculated by the movement route calculating unit 14, and when the vehicle 2 reaches the safety confirmation position 55 calculated by the safety confirmation position determining unit 15, the vehicle control ECU 24 decelerates the vehicle 2 to a predetermined speed or less. Decelerating the vehicle 2 to a predetermined speed or less includes, for example, a case where the vehicle 2 travels at a very slow speed, for example, at a speed of about several kilometers per hour as well as a case where the vehicle 2 temporarily stops (speed 0).

An in-vehicle display device 23 (see FIG. 2) displays, on a display, information such as the planned route at the time of exiting the parking slot received from the movement route calculating unit 14 and a safety confirmation message received from the safety confirmation position determining unit 15. Note that instead of the display on the display or together with the display on the display, means such as a voice synthesis output, a printer output, and an electronic mail transmission may be used.

Figure 2:
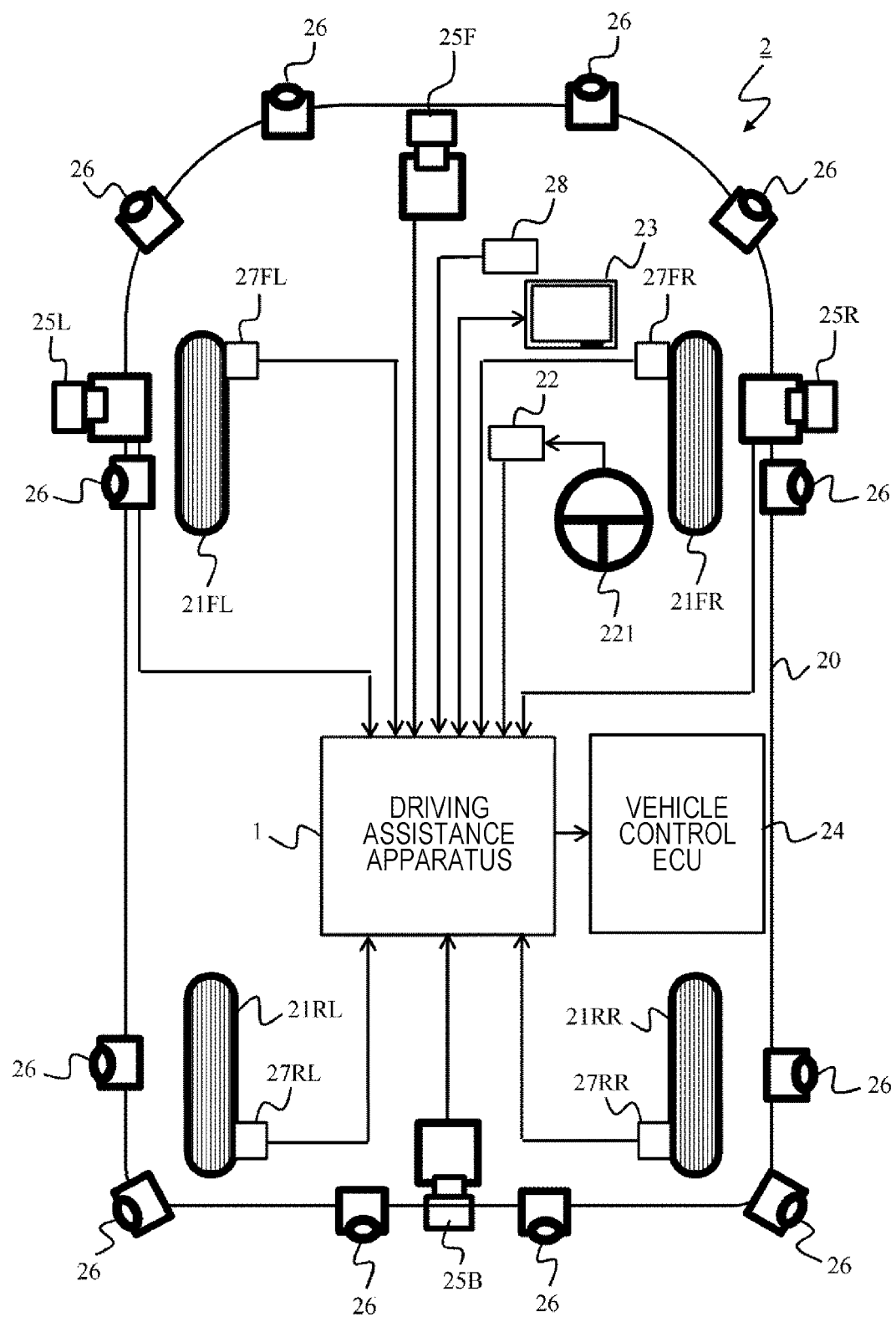
FIG. 2 is a schematic configuration diagram of a vehicle on which a driving assistance apparatus is mounted.

FIG. 2 shows a schematic configuration of the vehicle 2 on which the driving assistance apparatus 1 is mounted. A vehicle body 20 of the vehicle 2 is provided with an engine mechanism, a power train mechanism, an accelerator mechanism, a brake mechanism, and the like (all not shown).

Wheels 21FL, 21FR, 21RL, and 21RR are arranged on the front, rear, left, and right of the vehicle body 20, and wheel speed sensors 27FL, 27FR, 27RL, and 27RR are provided respectively on the wheels 21FL, 21FR, 21RL, and 21RR. That is, the left front wheel speed sensor 27FL detects a wheel speed of the left front wheel 21FL and sends the detected wheel speed to the driving assistance apparatus 1. The right front wheel speed sensor 27FR detects a wheel speed of the right front wheel 21FR and sends the detected wheel speed to the driving assistance apparatus 1. The left rear wheel speed sensor 27RL detects a wheel speed of the left rear wheel 21RL and sends the detected wheel speed to the driving assistance apparatus 1. The right rear wheel speed sensor 27RR detects a wheel speed of the right rear wheel 21RR and sends the detected wheel speed to the driving assistance apparatus 1. The driving assistance apparatus 1 calculates a speed of the vehicle 2 on the basis of information from each wheel speed sensors 27FL, 27FR, 27RL, and 27RR. Hereinafter, the wheels 21FL, 21FR, 21RL, and 21RR may be referred to as a wheel 21 and the wheel speed sensors 27FL, 27FR, 27RL, and 27RR may be referred to as a wheel speed sensor 27 unless particularly distinguished from one another.

An electric power steering device 22 changes a direction of the wheel 21 according to an operation amount (steering angle) of a steering wheel 221 provided in a driver's cab.

The electric power steering device 22 includes, for example, a steering angle sensor that detects the steering angle of the steering wheel 221, a motor that assists steering torque serving as torque that changes the direction of each wheel 21, and an electric power steering ECU that controls the steering torque (all not shown). The electric power steering device 22 controls the steering torque so as to assist an operation of the steering wheel 221 by the driver and changes a direction of each wheel 21. The steering angle detected by the steering angle sensor is transmitted to the driving assistance apparatus 1.

The in-vehicle display device 23 is provided in the driver's cab. The in-vehicle display device 23 provides information to the driver. The information provided to the driver includes, for example, an image captured by each camera 25 and processed by the driving assistance apparatus 1. Furthermore, as described later, the in-vehicle display device 23 presents the driver with a guidance state and the like when exiting the parking lot (parking slot). The in-vehicle display device 23 may be configured as, for example, a touch panel in which a display and an input device are integrated. The in-vehicle display device 23 may be a part of a car navigation system. The in-vehicle display device 23 may be configured as a head-up display. The in-vehicle display device 23 may include an information input device such as a keyboard, a voice instruction device, and a switch.

The vehicle control ECU 24 controls the vehicle 2. The vehicle control ECU 24 outputs a target steering angle to the electric power steering device 22 to control a traveling direction of the vehicle 2 in order to assist a driving operation to a place where the safety confirmation is possible. Furthermore, the vehicle control ECU 24 outputs required driving force to a driving force control ECU (not shown) that controls the driving force of the vehicle 2 and outputs required braking force to a braking force control ECU (not shown) that controls braking force, thereby controlling the speed of the vehicle 2. Furthermore, the vehicle control ECU 24 issues a request for a drive range, a reverse range, or a parking range to a shift-by-wire control device (not shown) that controls a shift range of an automatic transmission, thereby controlling a shift range of the vehicle 2. By controlling the vehicle 2 using the vehicle control ECU 24, the driver can receive appropriate parking assistance during an operation for parking at the place where safety confirmation is possible.

Cameras 25F, 25B, 25L, and 25R are provided around the vehicle body 20. A front camera 25F is provided at the front of the vehicle 2. A right camera 25R is provided at the right of the vehicle 2. A rear camera 25B is provided at the rear of the vehicle 2. A left camera 25L is provided at the left of the vehicle 2. Hereinafter, the cameras are referred to the camera 25 unless particularly distinguished from one another.

Each camera 25 is provided with a lens and an imaging element and is appropriately arranged to be able to capture a surrounding environment of the vehicle 2. An image captured by the camera 25 is transmitted to the driving assistance apparatus 1 and subjected to image processing. The camera 25 may be a monocular camera or a stereo camera. In the case of the stereo camera, the accuracy of the environmental information when the vehicle 2 stops can be increased.

A plurality of sonars 26 is installed at the front, rear, left and right of the vehicle 2. Each sonar 26 transmits an ultrasonic wave and receives a reflected wave reflected by an obstacle in the surroundings, thereby measuring a distance to the obstacle in the surroundings of the vehicle 2. A measurement result of the sonar 26 is transmitted to the driving assistance apparatus 1. The driving assistance apparatus 1 stores the measurement result of the sonar 26 as information on the obstacle in the surroundings of the vehicle.

A human sensor 28 detects the presence or absence of the driver in the vehicle 2 and transmits a detection result to the driving assistance apparatus 1. The human sensor 28 is configured, for example, as an infrared sensor.

The driving assistance apparatus 1 calculates a parking-slot-exiting route when the own vehicle 2 travels from the parking position at which the own vehicle 2 is parked to a parking-slot-exiting position on the basis of the environmental information as an example of the "outside world information" received from the camera 25 and the sonar 26. Then, the driving assistance apparatus 1 calculates a place where the driver can confirm the safety of the surroundings on the basis of the environmental information and the parking-slot-exiting route and transmits a calculation result to the in-vehicle display device 23 and the vehicle control ECU 24.

Figure 3:
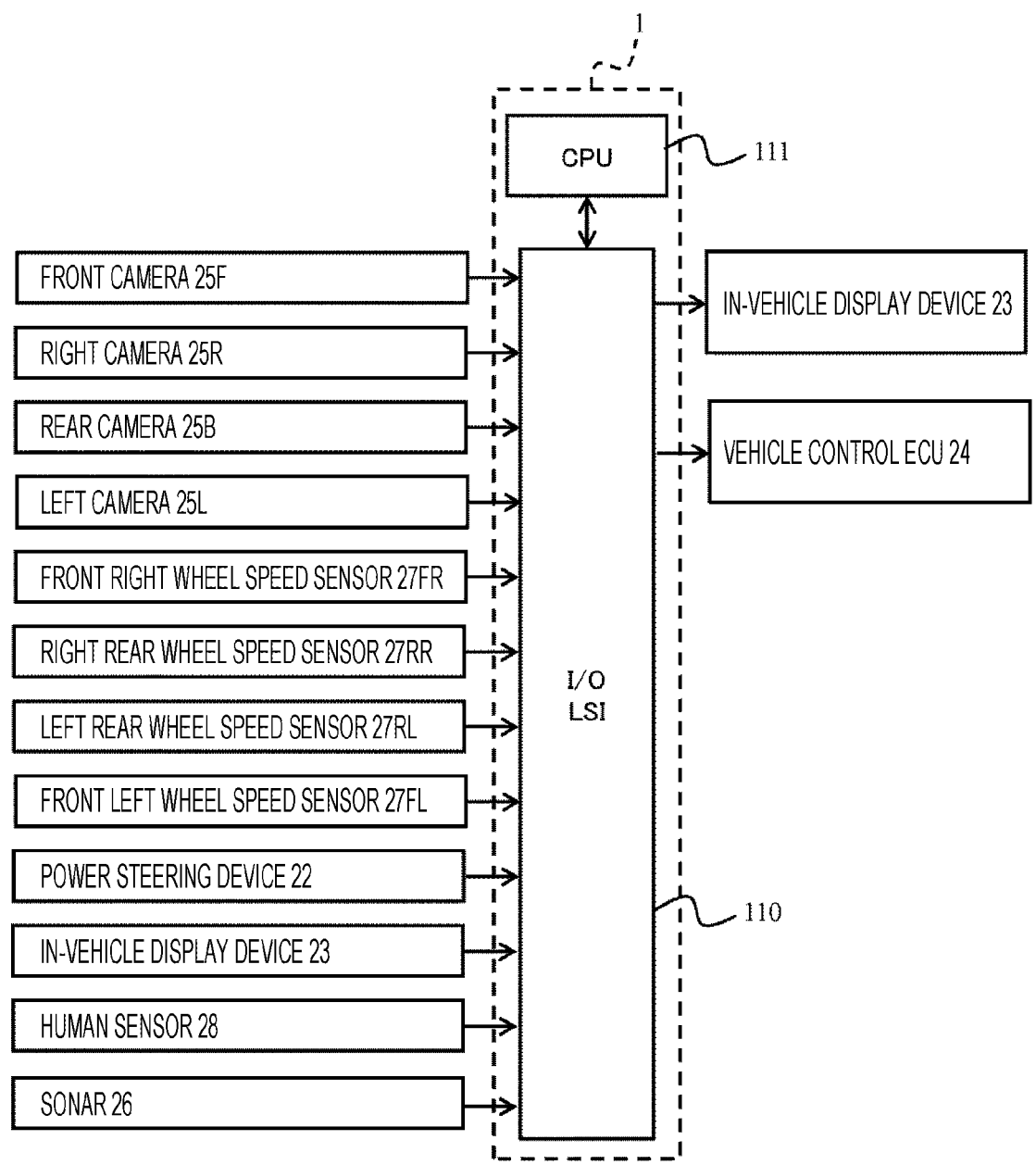
FIG. 3 is a descriptive view showing input and output with respect to the driving assistance apparatus.

FIG. 3 is a block diagram schematically showing an example of an internal configuration of the driving assistance apparatus 1 and showing a relationship between input and output signals of the driving assistance apparatus 1. The driving assistance apparatus 1 includes a large-scale integrated circuit (LSI) 110 for input/output (I/O) and a central processing unit (CPU) 111. The LSI 110 includes an analog/digital (A/D) converter.

The LSI 110 receives signals from each camera 25, the electric power steering device 22 (steering angle sensor), each wheel speed sensor 27, the in-vehicle display device (part of an information input device such as a touch panel), the human sensor 28, and the sonar 26.

The driving assistance apparatus 1 calculates the parking-slot-exiting route to travel from the parking position at which the own vehicle 2 is parked to the parking-slot-exiting position and the place where the driver can confirm the safety of the surroundings by predetermined calculation processing. The driving assistance apparatus 1 transmits a calculation result to the in-vehicle display device 23 and the vehicle control ECU 24, thereby achieving driving assistance for the vehicle 2 to automatically move to the place where safety confirmation is possible. This driving assistance can also be called the parking-slot-exiting assistance and the parking assistance.

FIG. 4 shows a functional block configuration of the inside of the driving assistance apparatus 1. Such functional block can be achieved by either hardware or software or a combination of the hardware and the software.

The movable position detecting unit 12 analyzes the information on the surrounding environment of the own vehicle (outside world information) captured by the camera and the surrounding environment of the own vehicle (outside world information) acquired on the basis of signal information of the sonar 26, whereby it is calculated as to whether there is a space to which the own vehicle 2 can exit the parking slot.

There are a case where no position possible for exiting the parking slot is found and a case a plurality of places possible for exiting the parking slot is found. As an example of analysis contents, in a case where there is a parking space in the surroundings of the own vehicle 2, the parking space having a width, a length, and a height equal to or more than a width, a length, and a height of the own vehicle 2, the space is set as a parking-slot-exiting candidate. The movable position detecting unit 12 transmits relative coordinate positions of the space of the exit candidate and the own vehicle 2 and an analysis result of the surrounding environment of the parking-slot-exiting candidate acquired at that time to the movement route calculating unit 14. Note that in the present embodiment, the information on the surrounding environment of the own vehicle analyzed on the basis of the signal information of the in-vehicle camera 25 and the sonar 26 is given as an example of an input, but the invention is not limited thereto. For example, the environmental information may be analyzed on the basis of information of a sensor using radio waves or light. In addition, in a case there is a space possible for exiting a parking slot that has width, a length, and a height equal to or more than the width, the length, and the height of the own vehicle 2, the space is considered as a parking-slot-exiting candidate. However, instead of that, an exit candidate may be detected from a parking lot information sign or the like.

The vehicle position detecting unit 13 calculates the speed of the vehicle 2 from a wheel speed received from each wheel speed sensor 27. Furthermore, the vehicle position detecting unit 13 receives the steering angle of the steering wheel 221 from the steering angle sensor of the electric power steering device 22 and calculates the traveling direction of the vehicle 2 from the steering angle. Then, the vehicle position detecting unit 13 calculates a coordinate position of the own vehicle 2 from the vehicle speed and the traveling direction of the vehicle 2 and transmits the coordinate position of the own vehicle 2 to the movement route calculating unit 14.

The movement route calculating unit 14 generates a route on which the vehicle 2 plans to move. The movement route calculating unit 14 calculates a parking-slot-exiting route connecting the position of the own vehicle 2 and a position possible for exiting the parking slot on the basis of a coordinate position of the parking-slot-exiting candidate and the information on the surrounding environment of the coordinate position of the exit candidate calculated by the movable position detecting unit 12, the coordinate position of the own vehicle 2 calculated by the vehicle position detecting unit 13, a parking-slot-exiting direction desired by the driver that is input from the in-vehicle display device 23, and the information on the presence or absence of the driver of the vehicle 2 detected by the human sensor 28.

As an example, the parking-slot-exiting route is configured as a route combining one or more of any of a straight line, a clothoid curve, and an arc, and it is assumed that an object in the surroundings and the own vehicle 2 do not contact with each other. Although the clothoid curve has been mentioned as a relaxation curve of the parking-slot-exiting route, other relaxation curves may be used. The movement route calculating unit 14 transmits the parking-slot-exiting route calculated in this manner to the in-vehicle display device 23, the vehicle control ECU 24, and the safety confirmation position determining unit 15.

The safety confirmation position determining unit 15 calculates and determines a place (safety confirmation position) at which the safety of the surroundings can be confirmed during the parking-slot-exiting assistance. The safety confirmation position determining unit 15 calculates the safety confirmation position during the parking-slot-exiting assistance on the basis of the information on the surrounding environment of the own vehicle captured by the camera 25, the signal information from the sonar 26, information on an estimated position of the vehicle calculated by the vehicle position detecting unit 13, and the parking-slot-exiting route calculated by the movement route calculating unit 14.

In a case where the vehicle is stopping before the parking-slot-exiting assistance starts, a range that can be detected by the camera 25 and the sonar 26 is limited. Therefore, by calculating the vehicle stop position regularly during the start of the parking-slot-exiting assistance, the safety confirmation position determining unit 15 can calculate a vehicle stop position as the safety confirmation position more accurately. The calculated vehicle stop position information is transmitted to the in-vehicle display device 23 and the vehicle control ECU 24. Here, a case where the safety confirmation position is calculated as the vehicle stop position has been described. However, instead of that, a position at which the speed of the own vehicle 2 is reduced to a degree sufficient for the driver to confirm the safety of the surroundings may be calculated as the safety confirmation position. That is, the safety confirmation position is a position at which the driver can confirm the safety of the surrounding traveling environment, and the speed of the vehicle 2 does not matter. The speed of the vehicle 2 at the safety confirmation position may be a predetermined speed or less so that the driver can confirm the safety.

The in-vehicle display device 23 displays a screen for the driver to input the desired parking-slot-exiting direction to the driving assistance apparatus 1 before starting the parking-slot-exiting assistance. The driver inputs the desired parking-slot-exiting direction through the screen. The parking-slot-exiting direction desired by the driver is transmitted to the movement route calculating unit 14. At the time of the parking-slot-exiting assistance, the movement route calculating unit 14 calculates the parking-slot-exiting route in consideration of the parking-slot-exiting direction desired by the driver.

The in-vehicle display device 23 superimposes the parking-slot-exiting route calculated by the movement route calculating unit 14 and the information on the surrounding environment of the parking-slot-exiting route on an image of the surroundings of the own vehicle 2 and displays the parking-slot-exiting route and the information on the surrounding environment of the parking-slot-exiting route on the screen. This screen display allows the driving assistance apparatus 1 to visually notify the driver of a destination place of exiting the parking slot and information on a surrounding environment of the destination place of exiting the parking slot. As will be described later, the driving assistance apparatus 1 displays a button for starting the parking-slot-exiting assistance on the screen. If there is no problem with the destination place of the exiting the parking slot, the driver presses the button to start the parking-slot-exiting assistance. The in-vehicle display device 23 transmits a signal indicating that the button has been pressed to the vehicle control ECU 24.

Furthermore, by displaying the vehicle stop position (safety confirmation position) calculated by the safety confirmation position determining unit 15 on the screen of the in-vehicle display device 23, it is possible to inform the driver in advance that the vehicle 2 will stop at the safety confirmation position. Then, when the vehicle 2 stops at the safety confirmation position, the driving assistance apparatus 1 displays a message prompting confirmation of safety on the screen of the in-vehicle display device 23 and prompts the driver to confirm safety.

The driver can visually confirm the safety of an area that cannot be detected by the camera 25 and the sonar 26. That is, by combining the confirmation of the surrounding environment by the camera 25 and the sonar 26 before the parking-slot-exiting assistance with the safety confirmation of the surrounding environment by the visual observation by the driver at the safety confirmation position during the parking-slot-exiting assistance, it is possible to enhance the safety at the time of the parking-slot-exiting assistance.

The driving assistance apparatus 1 displays a screen for inputting that the driver has confirmed the safety of the surroundings on the screen of the in-vehicle display device 23. The driver inputs the confirmation of the safety of the surroundings through the screen. As a result, a request for restart is transmitted to the vehicle control ECU 24, and the parking-slot-exiting assistance from the vehicle stop position (safety confirmation position) to the parking-slot-exiting position is resumed.

When the vehicle control ECU 24 receives a signal indicating that the parking-slot-exiting assistance start button has been pressed from the in-vehicle display device 23, the vehicle control ECU 24 controls the own vehicle 2 so as to travel along the parking-slot-exiting route calculated by the movement route calculating unit 14. As a result, the driver can receive appropriate assistance during an operation for moving the vehicle 2 along the parking-slot-exiting route to the parking-slot-exiting position.

After the parking-slot-exiting assistance starts, the vehicle 2 is controlled to stop at the vehicle stop position calculated by the safety confirmation position determining unit 15 and is stopped at the position. Then, when a signal indicating that the driver has confirmed the safety of the surroundings is input from the in-vehicle display device 23 to the vehicle control ECU 24, the vehicle 2 is controlled to travel to the parking-slot-exiting position along the parking-slot-exiting route.

Figure 5:
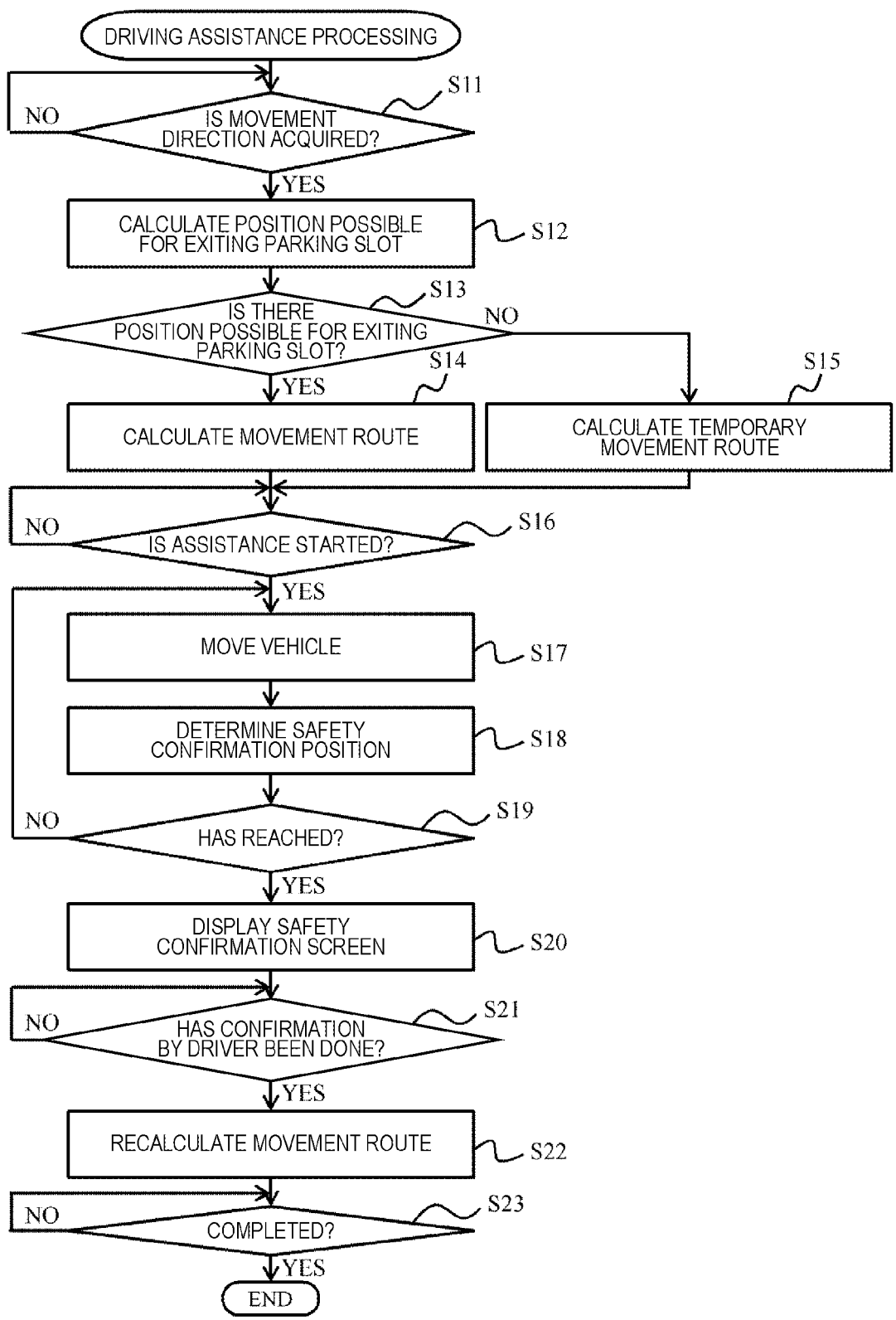
FIG. 5 is a flowchart showing driving assistance processing.

FIG. 5 is a flowchart showing driving assistance processing (parking-slot-exiting assistance processing) performed by the driving assistance apparatus 1. This flowchart shows a series of flow from the start of the parking-slot-exiting assistance to the completion of the parking-slot-exiting assistance.

First, the driving assistance apparatus 1 determines whether the driver of the vehicle 2 has input the parking-slot-exiting direction (movement direction) via an information input unit of the in-vehicle display device 23 (S11). In a case where the driver has input the parking-slot-exiting direction using a touch panel or the like mounted on the in-vehicle display device 23 in order to cause the own vehicle 2 to exit from a parking place (S11: YES), the processing proceeds to step S12. In a case where the driver does not input the parking-slot-exiting direction (S11: NO), the processing of step S11 is performed again. In other words, the driving assistance apparatus 1 waits until the driver selects the parking-slot-exiting direction. In the present embodiment, a case where the driver manually instructs the parking-slot-exiting direction will be described. However, the present invention is not limited to this, and the parking-slot-exiting direction may be automatically determined from the surrounding environment.

The driving assistance apparatus 1 analyzes the information on the surrounding environment of the own vehicle acquired by the camera 25 and the information on the surrounding environment of the own vehicle acquired on the basis of the signal information of the sonar 26 in the movable position detecting unit 12, thereby calculating whether there is a space to which the own vehicle 2 can exit (S12).

The driving assistance apparatus 1 determines whether the position possible for exiting the parking slot (position to which movement is possible) has been found (S13). When the driving assistance apparatus 1 finds a position possible for exiting the parking slot (S13: YES), the processing proceeds to step S14 and calculates the parking-slot-exiting route (movement route) connecting the current position of the vehicle 2 and the found position possible for exiting the parking slot (S14).

On the other hand, for example, when a large vehicle such as a bus or a truck with a long full length is parked on the left and right of the parking place where the own vehicle 2 is parked, it is difficult to detect the information on the surrounding environment of the own vehicle 2 with sensors such as the camera 25 and the sonar 26. In such a case, it may not be possible to find a position to which the own vehicle 2 can exit. In a case where a position to which the own vehicle 2 can exit cannot be found, the processing proceeds to step S15.

In step S14, in the driving assistance apparatus 1, the movement route calculating unit 14 calculates the parking-slot-exiting route connecting the position of the own vehicle 2 and the position possible for exiting the parking slot on the basis of coordinates of the possible for exiting the parking slot and the information on the surrounding environment of the possible for exiting the parking slot calculated by the movable position detecting unit 12.

In step S15, in the driving assistance apparatus 1, the movement route calculating unit 14 calculates a temporary parking-slot-exiting route. The temporary parking-slot-exiting route is generated as a route of only a straight line. A length of the straight line can be calculated on the basis of a length to an obstacle ahead of the vehicle 2. Alternatively, in a case where a parking frame 4 is present at the parking place of the own vehicle (see FIG. 1), a certain distance from a tip of the parking frame 4 may be set as the temporary parking-slot-exiting route. Although in the present embodiment, a case where the temporary parking-slot-exiting route is formed only by the straight line has been described. However, the present invention is not limited to this, and the temporary parking-slot-exiting route may include an arc or a clothoid if the temporary parking-slot-exiting route does not conflict with an obstacle.

The driving assistance apparatus 1 superimposes the parking-slot-exiting route and the information on the surrounding environment of the parking-slot-exiting route calculated in either of step S14 and step S15 on the image of the surrounding of the own vehicle 2 and displays the parking-slot-exiting route and the information on the surrounding environment of the parking-slot-exiting route on the screen of the in-vehicle display device 23. As a result, the driving assistance apparatus 1 visually notifies the driver of the destination place of exiting the parking slot and the information on the surrounding environment of the destination place. The driving assistance apparatus 1 displays a button for starting the parking-slot-exiting assistance (see a button GP24 in FIG. 7) on the screen of the in-vehicle display device 23. The driving assistance apparatus 1 monitors whether the button for starting the parking-slot-exiting assistance has been pressed and waits until the button is pressed (S16). When it is detected that the button has been pressed (S16: YES), the parking-slot-exiting assistance is started.

The driving assistance apparatus 1 starts the parking-slot-exiting assistance for moving the vehicle 2 from the current parking position to the parking-slot-exiting position and issues an instruction to the vehicle control ECU 24. The vehicle control ECU 24 starts the movement of the vehicle 2 along the parking-slot-exiting route in order to assist a parking-slot-exiting operation by the driver (S17).

During the parking-slot-exiting assistance of the vehicle 2, the safety confirmation position determining unit 15 calculates a position at which the driver confirms the safety of the surroundings (safety confirmation position) for each certain distance or for each certain cycle (S18). Specifically, the safety confirmation position determining unit 15 calculates the safety confirmation position on the basis of the information on the surrounding environment of the own vehicle captured by the camera 25, the signal information of the sonar 26, the position information of the own vehicle 2 calculated by the vehicle position detecting unit 13 and the parking-slot-exiting route calculated by the movement route calculating unit 14. The vehicle stop position information (safety confirmation position) calculated by the safety confirmation position determining unit 15 is superimposed on the image of the surrounding of the own vehicle 2 and displayed on the screen of the in-vehicle display device 23. The driver knows in advance that the vehicle 2 will temporarily stop at the position shown on the screen of the in-vehicle display device 23.

The driving assistance apparatus 1 determines whether the own vehicle 2 has reached the vehicle stop position (safety confirmation position) calculated in step S18 (S19) and in a case where it is determined that the own vehicle 2 has reached (S19: YES), the processing proceeds to step S20. In a case where it is determined that the vehicle has not reached (S19: NO), the processing returns to step S17, the processing returns to step S17, steps S18 and S19 are performed, and the movement and the vehicle stop position of the vehicle are calculated again. By executing steps S17 to S19 every time the vehicle 2 travels a certain distance or every time a certain period of time elapses, the vehicle stop position (safety confirmation position) at which the driver can confirm the safety of the surroundings can be calculated accurately.

When the driving assistance apparatus 1 reaches the safety confirmation position (S19: YES), the vehicle control ECU 24 causes the vehicle 2 to stop, causes the in-vehicle display device 23 to display text prompting the driver to confirm the safety of the surroundings at the vehicle stop position, and arranges a button indicating that safety confirmation has been completed (see a button GP42 in FIG. 9) on the screen.

The driving assistance apparatus 1 determines whether the safety confirmation by the driver has been completed (S21), and when it is determined that the visual safety confirmation by the driver is completed (S21: YES), the processing proceeds to step S22. That is, the driving assistance apparatus 1 waits the processing until the driver visually confirms the safety of the surroundings at the safety confirmation position and presses the safety confirmation completion button (S21: NO).

When the driving assistance apparatus 1 determines that the driver has pressed the safety confirmation completion button (S21: YES), in a case where there is a change in the information on the surrounding environment of the vehicle 2 between before the parking-slot-exiting assistance and after the parking-slot-exiting assistance starts, the parking-slot-exiting route is regenerated (S22).

When the vehicle 2 has reached an end point of the parking-slot-exiting route, that is, the parking-slot-exiting position, the driving assistance apparatus 1 displays a message to the effect that the parking-slot-exiting assistance processing is completed on the in-vehicle display device 23 and ends this processing normally (S23: YES).

States of the parking-slot-exiting assistance will be described using FIGS. 6 to 11. On the upper side of FIGS. 6 to 11, a state in which the parking lot is viewed from above is shown. On the lower side of FIGS. 6 to 11, examples of the screen displayed by the in-vehicle display device 23 are shown. In the examples of the screen, the own vehicle 2 on which the driving assistance apparatus 1 is mounted is displayed at the center. FIGS. 6 to 11 are arranged in chronological order.

In examples shown in FIGS. 6 to 11, six parking slots (parking spaces) P1 to P6 are shown. The own vehicle 2 stops at the parking slot P2 on a lower side. Other vehicles 3 (1) and 3 (2) to 3 (5) are parked in other parking slots P1 and P3 to P6.

Figure 6:
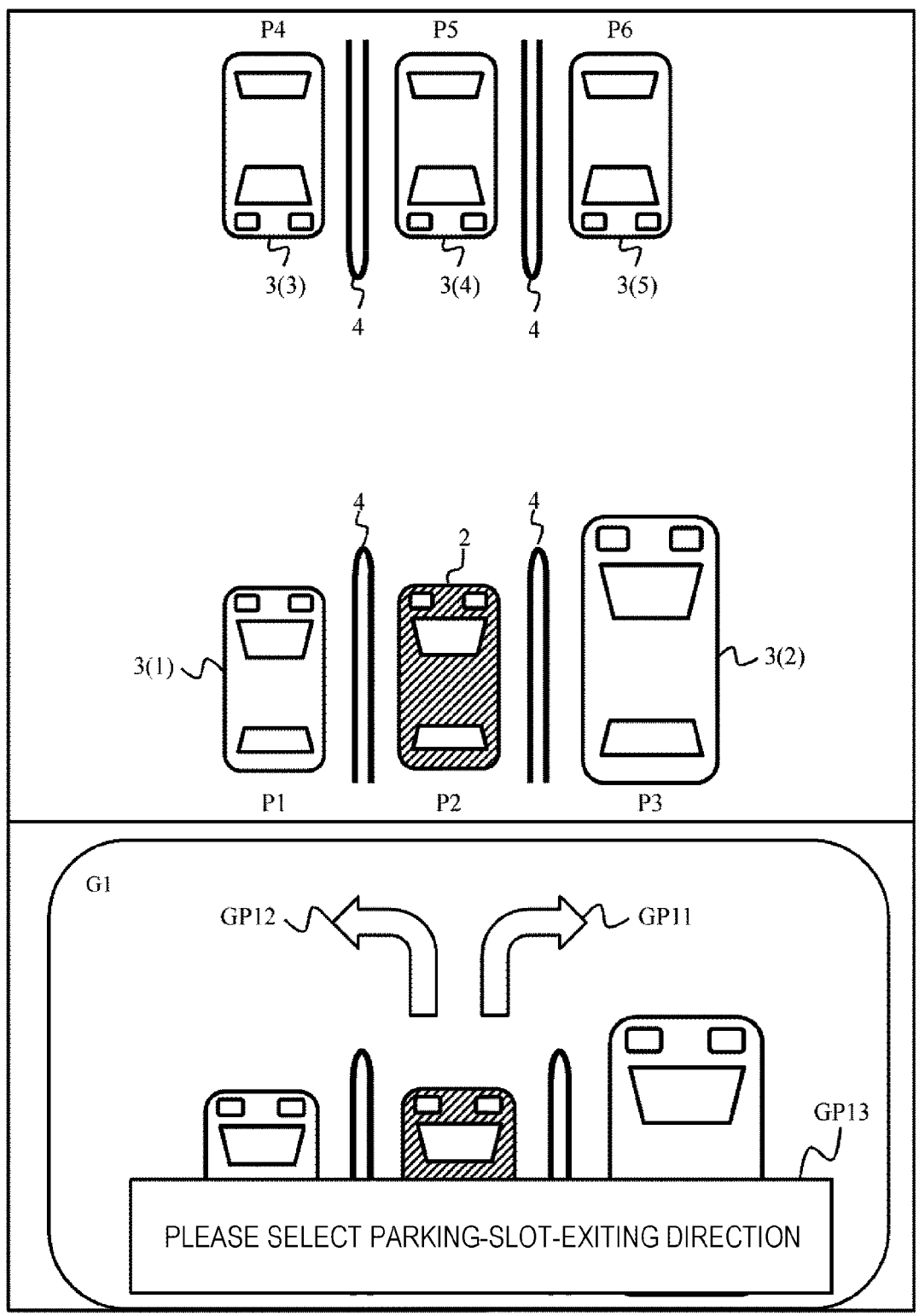
FIG. 6 is a descriptive view showing a state of driving assistance.

Please refer to FIG. 6. Here, in order for the own vehicle 2 to exit the parking space P1, a parking-slot-exiting assistance function provided by the driving assistance apparatus 1 is used. On a screen G1 of the in-vehicle display device 23 shown on the lower side of the figure, the surrounding environment of the own vehicle captured by the camera 25 is displayed. Illustration of a detection result by the sonar 26 is omitted.

On the screen G1, arrow marks GP11 and GP12 for the driver to indicate the parking-slot-exiting direction are displayed near the top of the own vehicle 2. The driver can press a mark indicating a desired direction among the marks GP11 and GP12. When the driver presses either of the marks GP11 and GP12, the parking-slot-exiting direction of the own vehicle 2 is determined (step S11 in FIG. 5).

Figure 7:
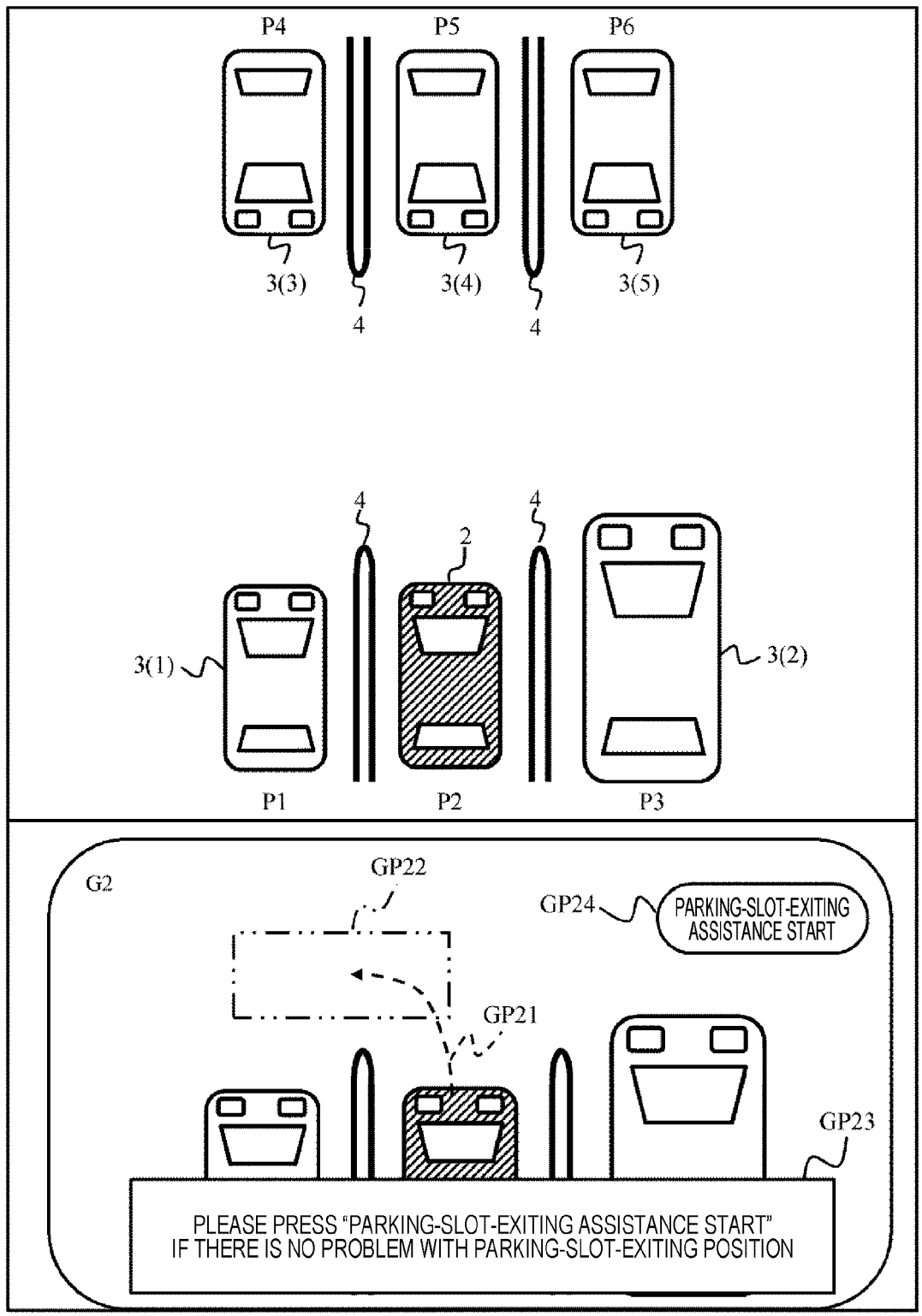
FIG. 7 is a descriptive view continued from FIG. 6.

Please refer to FIG. 7. FIG. 7 shows a state in which a parking-slot-exiting route GP21, a parking-slot-existing position GP22, a message GP23, and the button GP24 for starting the parking-slot-exiting assistance are displayed on a screen G2 output by the in-vehicle display device 23 and corresponds to steps S12 to S17.

The message GP23 displays, for example, contents such as "Please press "Parking-slot-exiting assistance start" if there is no problem with parking-slot-exiting position". The message may be notified by voice instead of or in addition to the characters.

If there is no problem with the parking-slot-exiting route GP21 and the parking-slot-exiting position GP22 displayed on the screen G2, the driver presses the button GP24 for starting the parking-slot-exiting assistance. By this button operation, the driving assistance apparatus 1 starts the parking-slot-exiting assistance.

Figure 8:
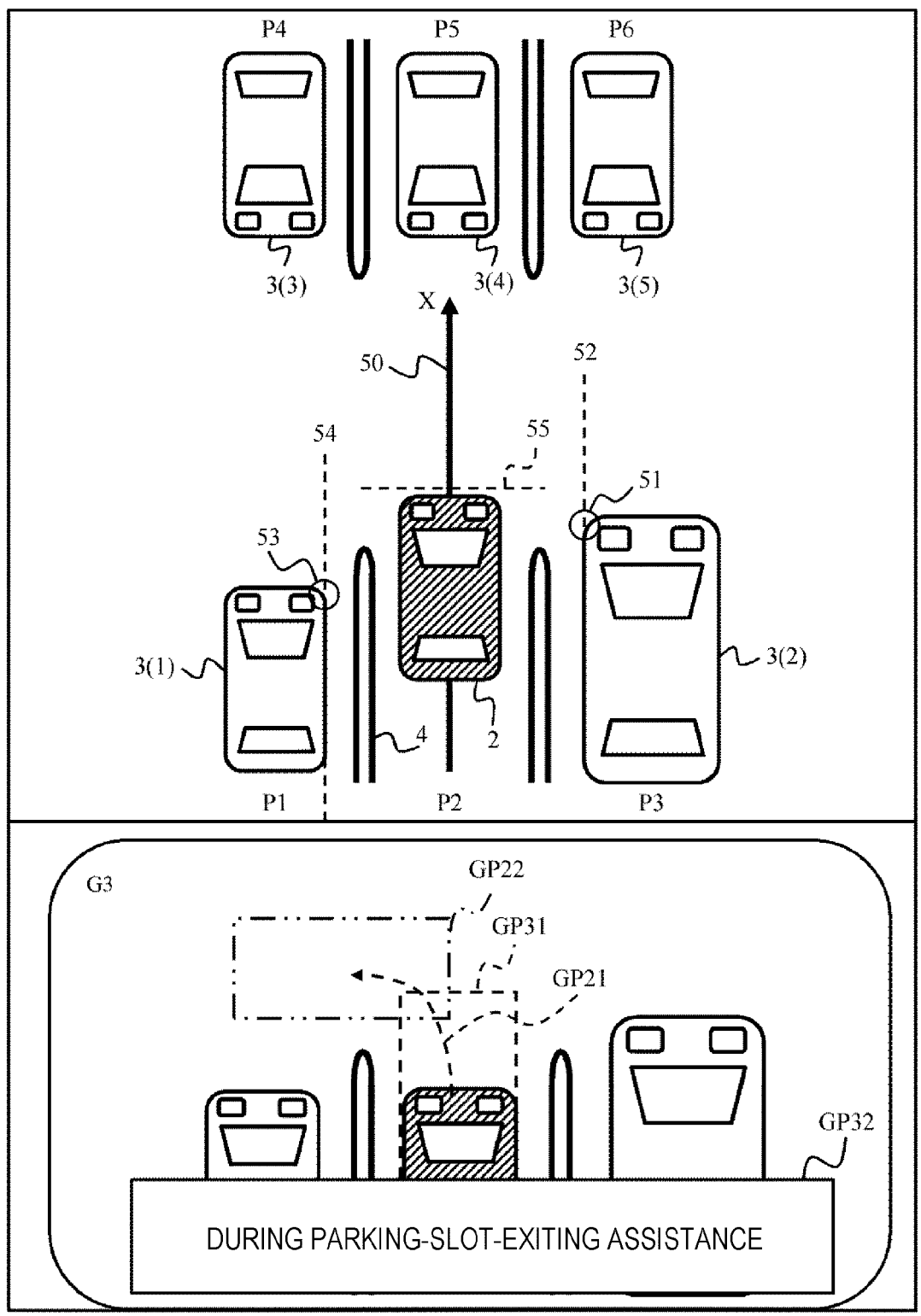
FIG. 8 is a descriptive view continued from FIG. 7.

Please refer to FIG. 8. In FIG. 8, a vehicle stop position GP31 at which the driver can confirm the safety of the surrounding environment is displayed on a screen G3. A stop position GP31 is an example of the safety confirmation position 55 shown in FIG. 1. In a message GP32, the driver is notified of contents, for example, "During parking-slot-exiting assistance". FIG. 8 corresponds to step S18 of FIG. 5.

As described above, the safety confirmation position determining unit 15 continues to regularly acquire the information on the surrounding environment of the own vehicle by the camera 25 and the sonar 26 mounted on the own vehicle 2 even during the parking-slot-exiting assistance and calculates the safety confirmation position.

In a case where another vehicle 3 (2) is present in the parking space P3 on the right of the parking space P1 where the own vehicle 2 stops, the safety confirmation position determining unit 15 acquires a left front end point 51 and a left side position 52 of another vehicle 3 (2) from the environmental information.

In a case where another vehicle 3 (1) is present in the parking space P1 next to the own vehicle 2, the safety confirmation position determining unit 15 acquirers a right front end point 53 and a right side position 54 of another vehicle 3 (1) from the environmental information in a manner similar to that described above.

Then, the safety confirmation position determining unit 15 sets an x coordinate of a rear axis center of the own vehicle 2 that stops in the parking space P1 to "0" and defines coordinates in which an straight advance direction of the vehicle 2 is a positive x coordinate as shown by an arrow 50. The safety confirmation position determining unit 15 selects an x coordinate value of the left front end point 51 or an x coordinate value of the right front end point 53, whichever is larger.

In a case where the measurement accuracy (estimate accuracy) of the left front end point 51 or the right front end point 53 is low, each x coordinate may be set to a sufficiently large value. In an example shown in FIG. 8, since the x coordinate of the left front end point 51 is larger than the x coordinate of the right front end point 53, the safety confirmation position determining unit 15 selects, as the vehicle stop position GP31, a point obtained by making a front end position 55 of the own vehicle 2 acquired from a calculation result of the vehicle position detecting unit 13 larger from a left front end point 51 by a certain value.

An amount projecting by a certain value in the traveling direction (x-axis direction) of the own vehicle 2 from an obstacle with a greater influence on visibility for safety confirmation (here, another vehicle 3 (2)) among adjacent obstacles may be a fixed value or a variable value. For example, a distance from a tip 55 of the own vehicle 2 to a position of the driver sitting in a driver's seat of the own vehicle 2 may be measured in advance, and a fixed value on the basis of the distance may be used as the certain value. Alternatively, the certain value may be calculated dynamically on the basis of the detection signal of the human sensor 28.

Note that in the present embodiment, description has been given assuming that the parking spaces P1 and P3 are also present on the left and right of the parking space P2 of the own vehicle 2, however, even if one of the left and the right is a wall, the present embodiment can respond to such case. Since another vehicle, a pedestrian, and the like do not pop out from a wall side, the safety confirmation position determining unit 15 may determine the vehicle stop position that becomes a safety confirmation position GP31 without considering the wall side.

By calculating the vehicle stop position as described above, it is possible to more accurately calculate the position at which the driver can confirm the safety of the surroundings even in a place where the surrounding environment changes depending on a parking place such as a parking lot. Then, by stopping the vehicle 2 at the calculated vehicle stop position or by reducing the speed to the extent that the driver can sufficiently confirm the safety of the surroundings, the driver can visually confirm the safety regarding an area that cannot be detected by the sensors such as the camera 25 and the sonar 26 mounted on the vehicle 2.

Figure 9:
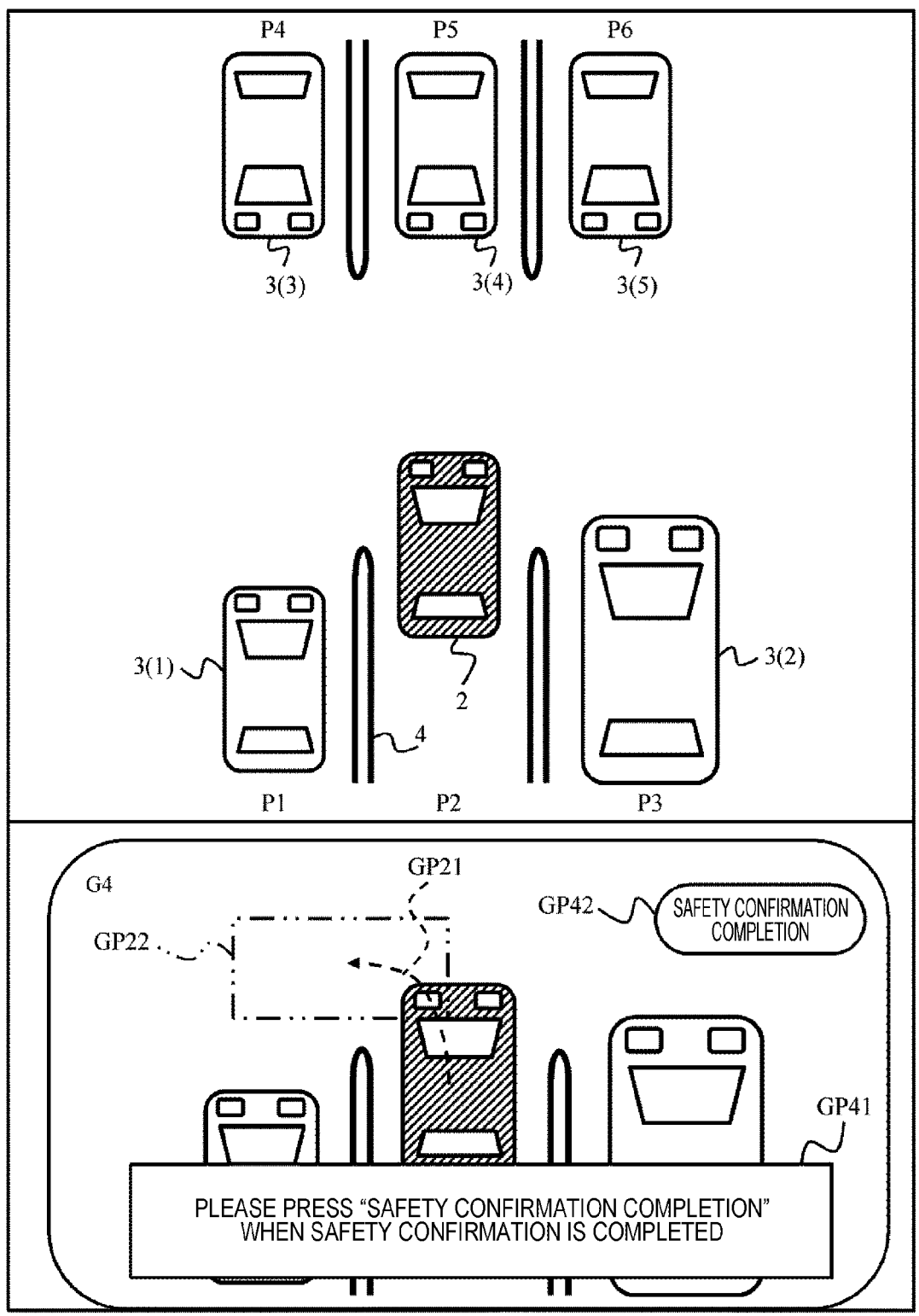
FIG. 9 is a descriptive view continued from FIG. 8.

FIG. 9 is a view showing a state in which the vehicle temporarily stops at the vehicle stop position. On a screen G4 of the in-vehicle display device 23, a message GP41 prompting the driver to confirm the safety of the surroundings is displayed. After confirming the safety of the surroundings, the driver presses the button GP42 indicating the completion of the safety confirmation. As a result, the driving assistance apparatus 1 learns that the visual safety confirmation by the driver is completed and resumes the parking-slot-exiting assistance processing. In a case where the surrounding environmental information of the own vehicle 2 acquired by the sensors such as the camera 25 and the sonar 26 has been changed from before the start of the parking-slot-exiting assistance, the parking-slot-exiting route may be regenerated on the basis of the information. FIG. 9 corresponds to steps S20 to S22 of FIG. 5.

Figure 10:
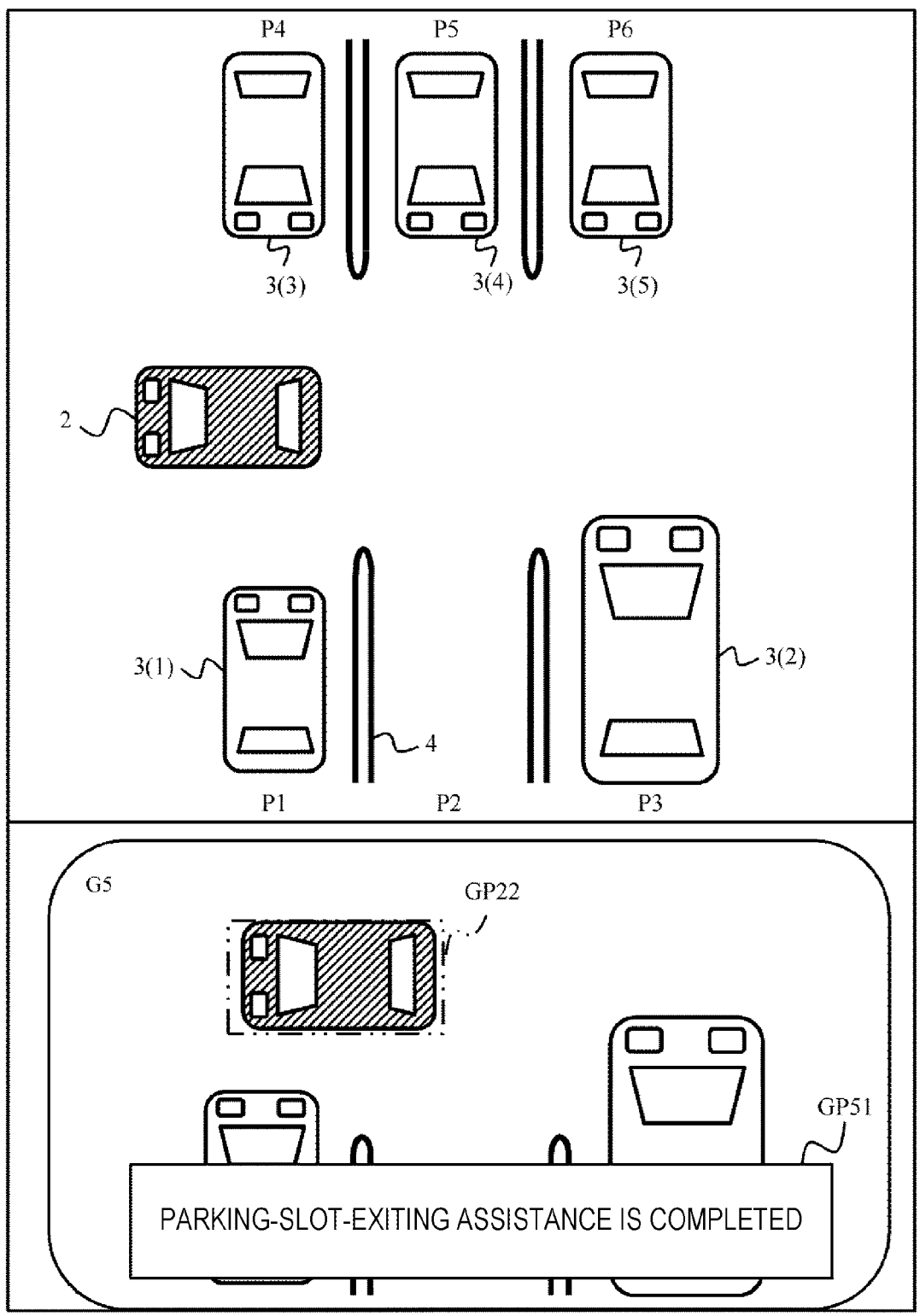
FIG. 10 is a descriptive view continued from FIG. 9.

FIG. 10 shows a state in which the parking-slot-exiting assistance is completed. In FIG. 10, the own vehicle 2 has reached the parking-slot-exiting position GP22 that is the end point of the parking-slot-exiting route. On a screen G5 of the in-vehicle display device 23, a message GP51 indicating that the parking-slot-exiting assistance is completed is displayed. FIG. 10 corresponds to a case where the determination in step S23 of FIG. 5 is YES.

Figure 11:
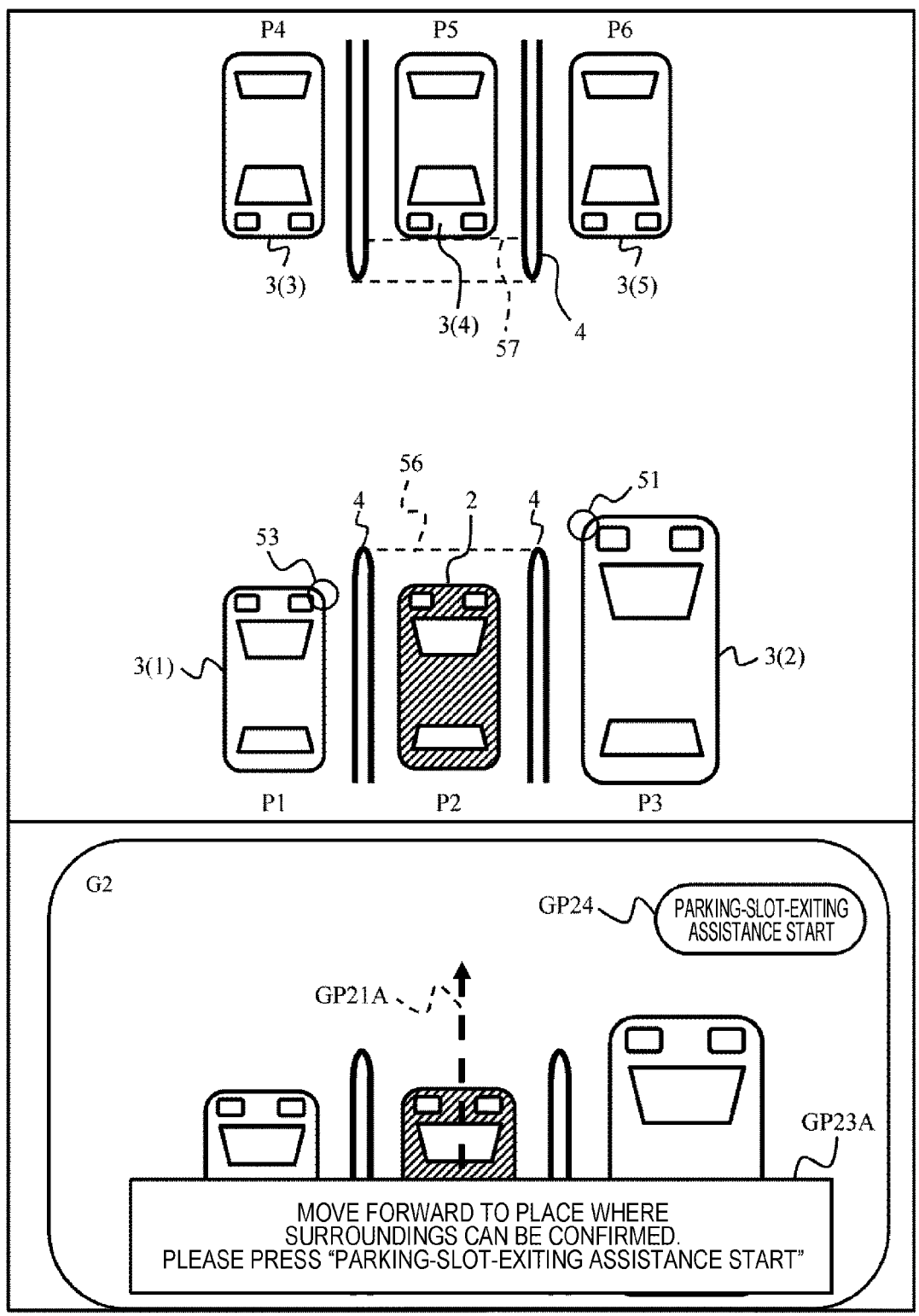
FIG. 11 is a descriptive view showing a state of driving assistance in a case where no space possible for exiting a parking slot is found.

Please refer to FIG. 11. FIG. 11 shows a case where a space possible for exiting the parking slot cannot be acquired when the parking-slot-exiting assistance starts. On a screen G2, a temporary parking-slot-exiting route GP21A is displayed. The temporary parking-slot-exiting route GP21A is a route that goes straight a certain distance from the current position.

In the present embodiment, a certain distance is set. However, instead of the certain distance, a variable distance may be set. For example, a distance is set in consideration of a tip 57 of another vehicle 3 (4) parked in the parking space P5 opposite, a frame front end 56 in a case where the parking frame 4 is present in a place where the own vehicle 2 is parked, a right front end point 53 of the vehicle parked in the parking space P1 next to the own vehicle 2, or a left front end point 51 of a vehicle parked in the parking space P3 next to the own vehicle, by using sensors such as the camera 25 and the sonar 26.

If there is no problem with the temporary parking-slot-exiting route GP21A, the driver of the own vehicle 2 presses the button GP24 for starting parking-slot-exiting assistance. As a result, the driving assistance apparatus starts the parking-slot-exiting assistance. FIG. 11 corresponds to step S15 of FIG. 5.

When the parking-slot-exiting assistance is started and the vehicle 2 is caused to go straight along the temporary parking-slot-exiting route GP21A, an amount of information on the surrounding environment of the own vehicle that can be acquired by the camera 25 and the sonar 26 increases. Then, as described in FIGS. 8 and 9, the own vehicle 2 is stopped once at the vehicle stop position calculated by the safety confirmation position determining unit 15. Then, in a case where the conformation of the safety of the surroundings by the driver is completed, the parking-slot-exiting assistance is resumed.

In a case where the position possible for exiting the parking slot cannot be found in step S13 of FIG. 5 (S13: NO), in other words, in a case where the temporary parking-slot-exiting route is calculated in step S15, the parking-slot-exiting route is generated when the parking-slot-exiting assistance is resumed (S22) and control is performed so as to move the vehicle 2 to the parking-slot-exiting position along the generated parking-slot-exiting route.

According to the present embodiment configured as described above, safety and usability can be improved when the vehicle 2 is guided from the vehicle stop state to a predetermined direction (parking-slot-exiting direction).

According to the present embodiment, in a parking lot having a special circumstance that other vehicles 3 having specifications such as a full length and a total height that are variously different from each other frequently enters and exits in a relatively short time, the vehicle 2 is caused to exit while the safety is secured, and the usability is improved. In a dynamic environment such as the parking lot, it is difficult to cause the vehicle 2 to safely exit the parking slot only on the basis of map data that is static data and GPS. To cope with this, the driving assistance apparatus 1 according to the present embodiment determines the safety confirmation position on the basis of the information from the outside world information sensor such as the camera 25 and the sonar 26, temporarily stops the vehicle 2 at the safety confirmation position, and after the safety of the surroundings is confirmed, the driving assistance apparatus 1 resumes the parking-slot-exiting assistance and causes the vehicle 2 to exit parking slot. Therefore, according to the present embodiment, the safe movement of the vehicle 2 can be assisted even under circumstances where the surrounding environment changes variously and vehicles and pedestrians move.

Second Embodiment

A second embodiment will be described with reference to FIG. 12. Each of the following embodiments including the present embodiment corresponds to a modification of the first embodiment, and therefore, differences from the first embodiment will be mainly described.

Figure 12:
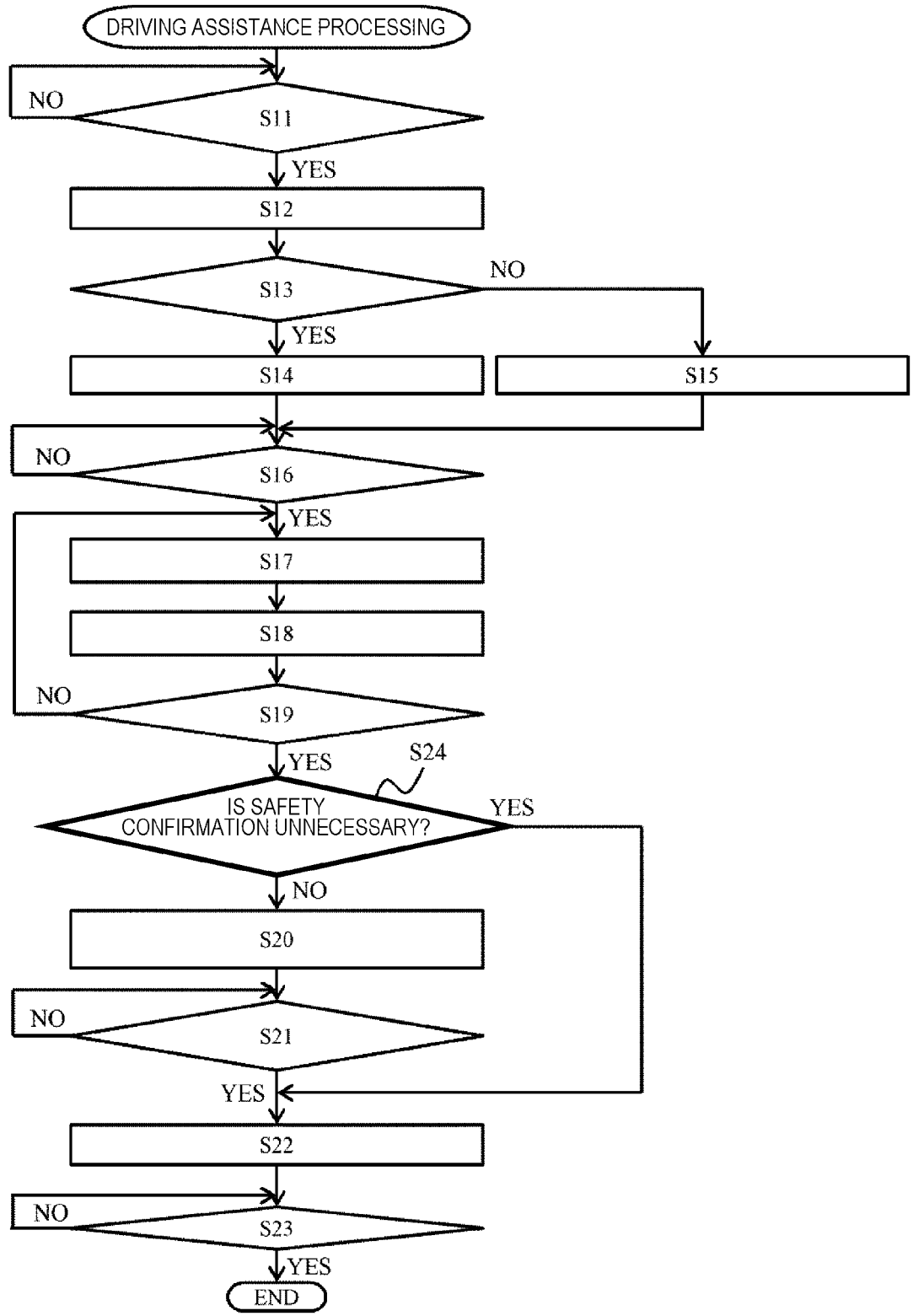
FIG. 12 is a flowchart showing driving assistance processing according to a second embodiment.

FIG. 12 is a flowchart showing the processing of a driving assistance apparatus 1 according to the present embodiment. A flowchart in FIG. 12 includes all of steps S11 to S23 described in the flowchart of FIG. 5. Furthermore, in a flowchart in FIG. 12, a new step S24 between steps S19 and S20 is performed.

That is, when a vehicle 2 reaches a safety confirmation position (S19: YES), the driving assistance apparatus 1 determines whether safety confirmation by visual observation by a driver is necessary (S24). In a case where it is determined that a predetermined safety condition is satisfied, the driving assistance apparatus 1 determines that the safety confirmation by the driver is unnecessary (S24: YES).

In a case where it is determined that the safety confirmation by the driver is unnecessary, steps S20 and S21 are skipped and the processing moves to step S22. When it is determined that the predetermined safety condition is not satisfied, the driving assistance apparatus 1 determines that the safety confirmation by the driver is necessary (S24: NO) and the processing proceeds to step S20.

As the predetermined safety condition, for example, there is a case where it is clear from the information from a camera 25 and the sonar 26 that no obstacle such as another vehicle 3 is present within a predetermined distance from an own vehicle 2. In addition, for example, in a case where left and right parking slots of the own vehicle 2 are vacant, the case may be set as the predetermined safety condition.

The present embodiment configured in this way also exhibits the same effects as those of the first embodiment. Furthermore, according to the present embodiment, a configuration is made so that in a case where the safety confirmation by the driver is unnecessary, the safety confirmation by the driver can be omitted. Therefore, the usability for the driver improves.

Third Embodiment

Figure 13:
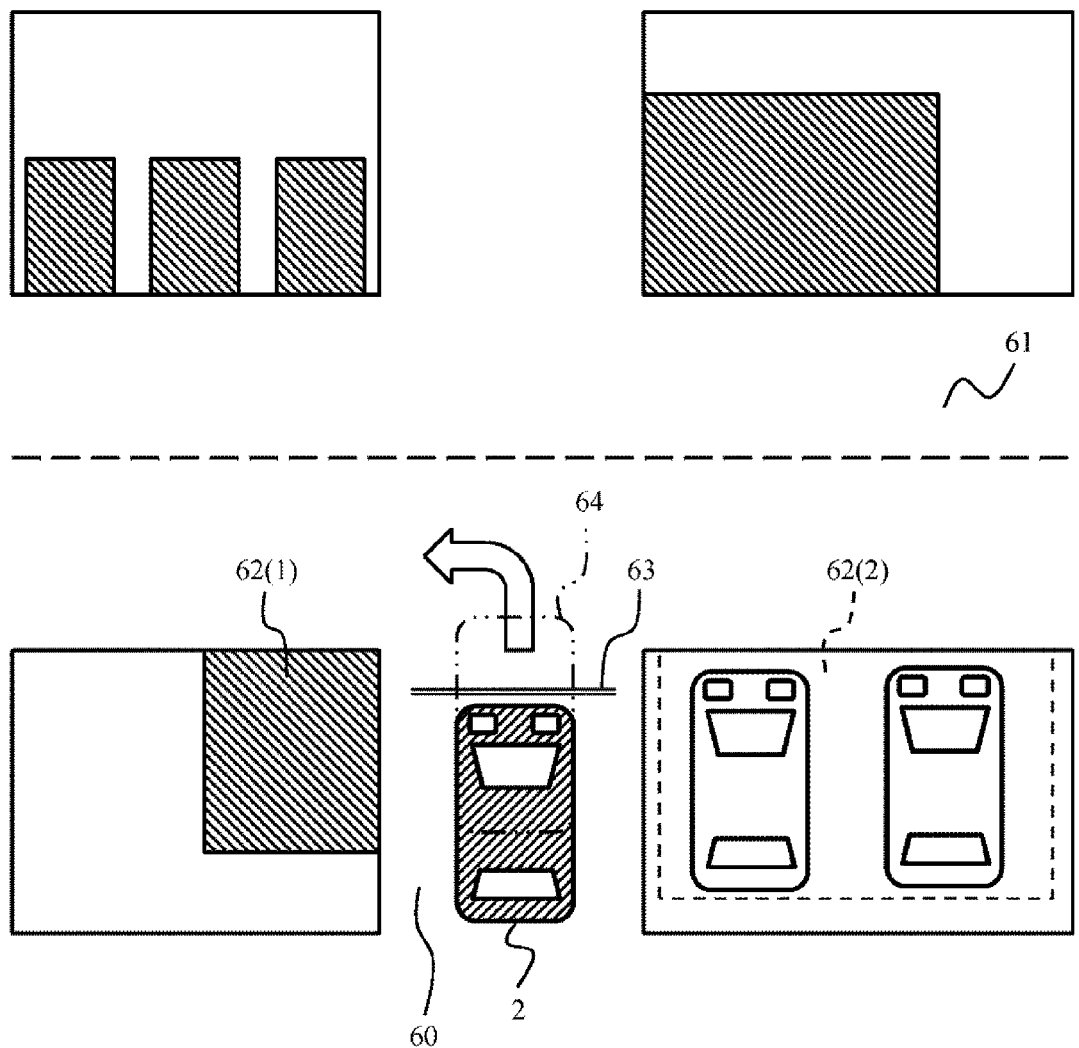
FIG. 13 is a descriptive view showing a state of assisting driving at an intersection according to a third embodiment.

A third embodiment will be described with reference to FIG. 13. In the present embodiment, a case where a driving assistance apparatus 1 is applied to an intersection will be described. Description will be given regarding a case where at an intersection where a first road 60 and a second road 61 intersect with each other, a vehicle 2 enters the priority road 61 from the narrow road 60.

The vehicle 2 stops once at a temporary stop line 63. Thereafter, the driving assistance apparatus 1 operates to start assistance for guiding the vehicle 2 to the priority road 61. The driving assistance apparatus 1 causes the vehicle 2 to go straight by a predetermined distance from the temporary stop line 63 and to stop at a safety confirmation position 64 and causes a driver to visually confirm safety by visual observation. When the driver confirms the safety, the driving assistance apparatus 1 resumes the guidance of the vehicle 2 and causes the vehicle 2 to merge into the priority road 61.

In a case where only fixed buildings are present at the intersection, it would also be possible to guide the vehicle 2 on the basis of static map data or GPS. However, in a case where in the surroundings of the intersection, there is not only a static building 62 (1) but also a parking lot 62 (2) whose situation changes dynamically, as shown in FIG. 12, it is not possible to respond to such case only by referring to the map data. To cope with that, by operating the driving assistance apparatus 1 according to the present embodiment even in a case where a parking lot is present at an intersection, the vehicle 2 can be safely guided to the road 61 and usability improves.

Fourth Embodiment

Figure 14:
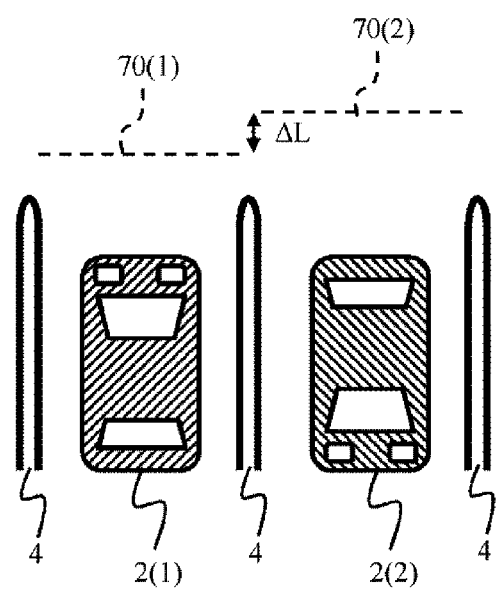
FIG. 14 is a descriptive view showing how a safety confirmation position is controlled in accordance with a direction when a vehicle is parked and stopped according to a fourth embodiment.

A fourth embodiment will be described with reference to FIG. 14. In the present embodiment, a safety confirmation position is determined according to a direction of a vehicle 2 at the time of stop. In the plan view of a parking lot shown in FIG. 13, a vehicle 2 (1) on the left is stopped forward (upward in the figure), and a vehicle 2 (2) on the right is stopped backward (downward in the figure).

In the present embodiment, a safety confirmation position 70 (2) in the case of assisting the exiting of the vehicle 2 (2) stopping backward from the parking slot is projected by a distance ΔL from a safety confirmation position 70 (1) in the case of assisting the exiting of the vehicle 2 (1) stopping forward from the parking slot. In a case where the vehicle 2 is caused to exit the parking slot in reverse, since it is difficult for a driver to visually confirm a surrounding environment, a safety confirmation position is set to the back.

The present embodiment configured in this way also exhibits the same effects as those of the first embodiment. Furthermore, in the present embodiment, since the safety confirmation position is determined in consideration of a direction when the vehicle is stopped, safety and usability can be further improved.

Note that the present invention is not limited to the above-described embodiments and includes various modifications. The above-described embodiments have been described in detail to describe the present invention in detail in an easy-to-understand manner. Therefore, the present invention is not limited to an embodiment that includes all the configurations described above. In addition, a part of the configuration of an embodiment can be replaced by the configuration of another embodiment. In addition, the configuration of another embodiment can be added to the configuration of an embodiment. In addition, with respect to a part of the configuration of each embodiment, other configurations can be added, deleted, or replaced.

All or a part of each of the above-described configurations, functions, processing units, processing means, and others may be achieved by, for example, hardware through design of integrated circuits or others. In addition, each of the above-described configurations, functions, and others may be achieved by software through interpretation and execution of a program that achieves each function by a processor. Information such as a program, a table, and a file that achieve each function can be stored in a recording device such as a memory, a hard disk, and a solid state drive (SSD) or a recording medium such as an integrated circuit (IC) card, a secure digital (SD) card, and a digital versatile disc (DVD).

In addition, technical features included in the above-described embodiments are not limited to combinations specified in claims and can be combined as appropriate.

REFERENCE SIGNS LIST 1 driving assistance apparatus
2 vehicle
3 another vehicle
4 parking frame
11 outside world information acquiring unit
12 movable position detecting unit
13 vehicle position detecting unit
14 movement route calculating unit
15 safety confirmation position determining unit
22 electric power steering device
23 in-vehicle display device
24 vehicle control ECU
25F, 25B, 25R, 25L camera
26 sonar
55 safety confirmation position

The invention claimed is:

1. A driving assistance apparatus that assists driving of a vehicle, the driving assistance apparatus comprising:
   an outside world information acquiring unit that acquires outside world information on surroundings of an own vehicle, the outside world information having a first value;
   a vehicle position detecting unit that detects a position of the own vehicle, the position of the own vehicle having a second value;
   a movement route calculating unit that calculates a movement route when the own vehicle moves in a predetermined direction by automatic driving from a vehicle stop state in a predetermined area; and
   a safety confirmation position determining unit that determines
   a safety confirmation position present on the movement route calculated by the movement route calculating unit on a basis of the outside world information acquired by the outside world information acquiring unit and the position of the own vehicle acquired by the vehicle position detecting unit, the safety confirmation position being a safety confirmation position at which a driver can visually confirm a surrounding traveling environment, and
   a vehicle stop position determined by selecting a point obtained by making the second value larger than the first value of the outside world information by a certain value, the certain value being related to a characteristic of the driver,
   wherein, at regular intervals, the driving assistance apparatus moves the vehicle, determines the safety confirmation position, and determines whether the vehicle has reached the safety confirmation position,
   wherein the driving assistance apparatus reduces a speed of the own vehicle to a predetermined speed or less so that the driver can visually confirm the surrounding traveling environment at the vehicle stop position and the safety confirmation position,
   wherein, when the driving assistance apparatus determines the vehicle has not reached the safety confirmation position, the vehicle moves to the vehicle stop position, and
   wherein the certain value is a fixed value based on a distance from a tip of the own vehicle to a position of the driver sitting in a driver's seat of the own vehicle or a dynamic value based on a detection signal of a human sensor.

2. The driving assistance apparatus according to claim 1, wherein in a case where the own vehicle has reached the safety confirmation position, the driving assistance apparatus prompts visual confirmation of the surrounding traveling environment by notifying the driver via a notification unit.

3. The driving assistance apparatus according to claim 2, wherein in a case where the own vehicle has reached the safety confirmation position, the driving assistance apparatus confirms whether safety confirmation indicating an effect that the driver visually confirmed the surrounding traveling environment has been received from the driver, and in a case where the safety confirmation has been received, the driving assistance apparatus allows the own vehicle to move from the safety confirmation position.

4. The driving assistance apparatus according to claim 3, wherein in a case where the own vehicle has reached the safety confirmation position, when a predetermined condition set in advance as a condition that the safety confirmation by the driver can be omitted is satisfied, the driving assistance apparatus allows the own vehicle to move from the safety confirmation position without the safety confirmation received from the driver.

5. The driving assistance apparatus according to claim 1, wherein the predetermined direction is determined by an instruction by the driver.

6. The driving assistance apparatus according to claim 1, wherein in a case where the movement route calculating unit determines that no space for the own vehicle to move in the predetermined direction is present on the basis of the outside world information acquired by the outside world information acquiring unit, the movement route calculating unit calculates, as the movement route, a temporary route to move the own vehicle to a temporary position.

7. The driving assistance apparatus according to claim 1, wherein the safety confirmation position determining unit determines the safety confirmation position on a basis of another stopped vehicle present in the surroundings of the own vehicle or a parking frame indicating a parking slot.

8. The driving assistance apparatus according to claim 7, wherein the safety confirmation position determining unit determines the safety confirmation position according to a direction of the own vehicle.

9. The driving assistance apparatus according to claim 8, wherein the predetermined area is the parking slot.

10. A driving assistance method of assisting driving of a vehicle using a calculator, wherein the calculator:
   acquires information on surroundings of an own vehicle, the information on surroundings having a first value,
   detects a position of the own vehicle, the position of the own vehicle having a second value,
   calculates a movement route when the own vehicle moves in a predetermined direction by automatic driving from a vehicle stop state in a predetermined area,
   determines a safety confirmation position which is present on the movement route calculated on a basis of the detected outside world information and the position of the own vehicle, the safety confirmation position being a position at which a driver can visually confirm a surrounding traveling environment,
   determines a vehicle stop position by selecting a point obtained by making the second value larger than the first value by a certain value, the certain value being related to a characteristic of the driver,
   at regular intervals, starts movement of the vehicle towards the safety confirmation position and determines whether the vehicle has reached the safety confirmation position,
   reduces a speed of the own vehicle to a predetermined speed or less so that the driver can visually confirm the surrounding traveling environment at the vehicle stop position and the safety confirmation position, and
   moves, when the vehicle has not reached the safety confirmation position, the vehicle to the vehicle stop position,
   wherein the certain value is a fixed value based on a distance from a tip of the own vehicle to a position of the driver sitting in a driver's seat of the own vehicle or a dynamic value based on a detection signal of a human sensor.

* * * * *